US006987150B2

(12) United States Patent
Kurth et al.

(10) Patent No.: US 6,987,150 B2
(45) Date of Patent: *Jan. 17, 2006

(54) MODIFIED SULFONAMIDE POLYMERS

(75) Inventors: Christopher J. Kurth, St. Louis Park, MN (US); Steven D. Kloos, Chanhassen, MN (US); Jessica A. Peschl, Minneapolis, MN (US); Leonard T. Hodgins, Closter, NJ (US)

(73) Assignee: Osmonics, Inc., Minnetonka, MN (US)

( * ) Notice: Subject to any disclaimer, the term of this patent is extended or adjusted under 35 U.S.C. 154(b) by 53 days.

This patent is subject to a terminal disclaimer.

(21) Appl. No.: 10/302,757

(22) Filed: Nov. 22, 2002

(65) Prior Publication Data

US 2003/0125483 A1  Jul. 3, 2003

Related U.S. Application Data

(63) Continuation of application No. PCT/US01/16849, filed on May 23, 2001.

(60) Provisional application No. 60/206,373, filed on May 23, 2000.

(51) Int. Cl.
C08G 75/30 (2006.01)
C08F 8/02 (2006.01)

(52) U.S. Cl. ............... 525/535; 525/510; 525/512; 525/513; 525/540; 525/509; 528/422; 528/480; 528/486; 528/487; 528/488; 528/492; 528/495

(58) Field of Classification Search ............ 525/509, 525/510, 512, 513, 535, 540; 528/422, 480, 528/486, 487, 488, 492, 495
See application file for complete search history.

(56) References Cited

U.S. PATENT DOCUMENTS

| 856,310 A | 6/1907 | Stone |
| 873,606 A | 12/1907 | Rhoades |
| 875,067 A | 12/1907 | Green |
| 875,070 A | 12/1907 | Haas et al. |
| 875,072 A | 12/1907 | Harbach |
| 2,808,394 A | 10/1957 | Speck ............... 260/79.3 |
| 2,853,475 A | 9/1958 | Murphey ............ 260/79.3 |
| 2,875,183 A | 2/1959 | Murphey ............ 260/79.3 |
| 3,744,642 A | 7/1973 | Scala et al. |
| 3,914,358 A | 10/1975 | Dixon et al. .......... 264/41 |
| 3,951,815 A | 4/1976 | Wrasidlo ........ 210/500 M |
| 3,988,883 A * | 11/1976 | Sze .................. 57/245 |
| 4,039,440 A | 8/1977 | Cadotte ............ 210/23 H |
| 4,080,483 A | 3/1978 | Kray ................. 428/290 |
| 4,107,155 A | 8/1978 | Fletcher et al. ....... 528/373 |
| 4,242,208 A | 12/1980 | Kawaguchi et al. .... 210/500.2 |
| 4,251,387 A | 2/1981 | Lim et al. ............ 252/316 |
| 4,252,591 A * | 2/1981 | Rosenberg ............ 156/203 |
| 4,265,745 A | 5/1981 | Kawaguchi et al. ....... 210/654 |
| 4,277,344 A | 7/1981 | Cadotte .............. 210/654 |
| 4,302,336 A | 11/1981 | Kawaguchi et al. ....... 210/654 |
| 4,360,434 A | 11/1982 | Kawaguchi et al. .... 210/500.2 |
| 4,388,189 A | 6/1983 | Kawaguchi et al. ....... 210/490 |
| 4,619,767 A | 10/1986 | Kamiyama et al. ....... 210/490 |
| 4,758,343 A | 7/1988 | Sasaki et al. ........ 210/500.38 |
| 4,761,234 A | 8/1988 | Uemura et al. ....... 210/500.38 |
| 4,765,897 A | 8/1988 | Cadotte et al. ....... 210/500.23 |
| 4,857,363 A | 8/1989 | Sasaki et al. ............ 427/245 |
| 4,872,984 A | 10/1989 | Tomaschke .......... 210/500.38 |
| 4,948,507 A | 8/1990 | Tomaschke .......... 210/500.38 |
| 4,950,404 A | 8/1990 | Chau .............. 210/500.27 |
| 4,983,291 A | 1/1991 | Chau et al. .............. 210/490 |
| 5,051,178 A | 9/1991 | Uemura et al. ....... 210/500.38 |
| 5,085,777 A | 2/1992 | Arthur ............... 210/500.38 |
| 5,234,598 A | 8/1993 | Tran et al. .............. 210/654 |
| 5,258,203 A | 11/1993 | Arthur ................ 427/245 |
| 5,262,054 A | 11/1993 | Wheeler .............. 210/639 |
| 5,271,843 A | 12/1993 | Chau et al. ............. 210/654 |
| 5,358,745 A | 10/1994 | Tran et al. .............. 427/333 |
| 5,576,057 A | 11/1996 | Hirose et al. ............ 427/245 |
| 5,614,099 A | 3/1997 | Hirose et al. ............ 210/653 |
| 5,627,217 A * | 5/1997 | Rilling et al. ............ 521/50 |
| 5,658,460 A | 8/1997 | Cadotte et al. ....... 210/500.38 |
| 5,674,398 A | 10/1997 | Hirose et al. ......... 210/500.38 |
| 5,693,227 A | 12/1997 | Costa ................ 210/650 |
| 5,733,602 A | 3/1998 | Hirose et al. ............ 427/245 |
| 5,744,039 A | 4/1998 | Itoh et al. ............. 210/644 |
| 5,811,387 A | 9/1998 | Simon et al. ............. 514/2 |
| 5,843,351 A | 12/1998 | Hirose et al. ............ 264/45.1 |
| 5,945,000 A | 8/1999 | Skidmore et al. ........... 210/650 |
| 6,024,873 A | 2/2000 | Hirose et al. ......... 210/500.38 |
| 6,103,865 A | 8/2000 | Bae et al. .............. 528/373 |
| 6,837,996 B2 * | 1/2005 | Kurth et al. .......... 210/500.38 |

FOREIGN PATENT DOCUMENTS

EP  0505502  9/1993

(Continued)

OTHER PUBLICATIONS

Cadotte, J. E., et al., "Advanced Poly(Piperazineamide) Reverse Osmosis Membranes", *Office of Water Research and Technology Report, U.S. Department of the Interior PB80-127574*, Contract No. 14-34-0001-8512,(1979).

(Continued)

*Primary Examiner*—Jeffrey B. Robertson
(74) *Attorney, Agent, or Firm*—Viksnins Harris & Padys PLLP

(57) ABSTRACT

The invention provides secondary sulfonamide polymers, wherein some, most, or all of the sulfonamido protons have been replaced with a substituent other than hydrogen. The invention also provides methods for preparing such polymers as well as devices (e.g. composite membranes) incorporating such membranes.

7 Claims, No Drawings

FOREIGN PATENT DOCUMENTS

| EP | 0787525 | | 8/1997 |
|---|---|---|---|
| EP | 0992277 | | 4/2000 |
| EP | 1020218 | | 7/2000 |
| EP | 0718029 | | 4/2003 |
| GB | 875069 | * | 8/1961 |
| GB | 875072 | | 8/1961 |
| JP | 63-012310 | | 1/1988 |

OTHER PUBLICATIONS

Dickson, J. M., et al., "Development of a Coating Technique for the Internal Structure of Polypropylene Microfiltration Membranes", *Journal of Membrane Science, 148*, (1998), 25-36.

Evers, Robert C., et al., "Notes: Preparation and Thermal Properties of Some Piperazine Polysulfonamides", *Journal of Polymer Science Part A-1, 5*, (1967),1797-1801.

Imai, Yoshio, et al., "Synthesis of Polysulfonamides from Aromatic Disulfonyl Bromides and Diamines", *Journal of Polymer Science, Polymer Chemistry Ed., 17*, (1979),2929-2933.

Ji, J., "Fabrication of Thin-Film Composite Membranes with Pendant, Photoreactive Diazoketone Functionality", *Journal of Applied Polymer Science, 64*, (1997),2381-2398.

Ji, J., et al., "Mathematical Model for the Formation of Thin-Film Composite Membranes by Interfacial Polymerization: Porous and Dense Films", *Macromolecules, 33*, (2000),624-633.

Jiang, Ji M., "Fabrication and Photochemical Surface Modification of Photoreactive Thin-Film Composite Membranes and Model Development For Thin Film Formation by Interfacial Polymerization", *McMaster University*, UMI Dissertation Services,(1996).

Morgan, Paul, "VII. Polysulfonamides and Polyphosphonamides", *In: Condensation Polymers*, Interscience Publishers: New York City,(1965),304-324.

Stake, A. M., et al., "Preparation of Reverse-Osmosis Membranes by Surface Modification of Polymeric Films", *In: NTIS U.S. Department of Commerce Report PB208790*, Contract No. 14-30-2750, Progress Report No. 768,(Apr. 1972).

Sundet, S. A., et al., "Interfacial Polycondensation. IX. Polysulfonamides", *Journal of Polymer Science, XL*, (1959), 389-397.

Trushinski, B. J., et al., "Photochemically Modified Thin-Film Composite Membranes. II. Bromoethyl Ester, Dioxolan, and Hydroxyethyl Ester Membranes", *Journal of Applied Polymer Science, 54*, (1994),1233-1242.

Trushinski, B. J., et al., "Photochemically Modified Thin-Film Composite Membranes. I. Acid and Ester Membranes", *Journal of Applied Polymer Science, 48*, (1993),187-198.

Trushinski, B. J., "Polysulfonanide Thin-Film Composite Reverse Osmosis Membranes", *Journal of Membrane Science, 143*, (1998),181-188.

Chan, Wing-Hong , et al., "Water-alcohol separation by pervaporation through chemically modified poly (amidesulfonamide)s", *Journal of Membrane Science*, vol. 160 (1999), pp. 77-86.

* cited by examiner

MODIFIED SULFONAMIDE POLYMERS

PRIORITY OF INVENTION

This application is a continuation under 35 U.S.C. 111(a) of International Application No. PCT/US01/16849 filed May 23, 2001 and published as WO 01/90223 A1 on Nov. 29, 2001, which claims priority to U.S. Provisional Application No. 60/206,373, filed 23 May 2000, which applications and publication are incorporated herein by reference.

BACKGROUND OF THE INVENTION

Sulfonamide polymers are incorporated into a variety of materials and devices. One of the major areas where sulfonamide polymers have been proposed for use is in the field of separations. For example, sulfonamide polymers can be used to prepare semi-permeable membranes, which have been proposed for use in separating solution components. Such membranes are a type of filter able to retain certain substances while transmitting others. The components of the feed fluid that pass through the membrane comprise the "permeate" and those that do not pass through the membrane (i.e., are rejected by the membrane or are held by the membrane) comprise the "retentate". In practice, the permeate, the retentate, or both streams may represent the desired product and may be used as obtained or may be subjected to further processing. In order to be economically viable, the membrane must provide sufficient flux (the rate of permeate flow per unit of membrane area) and separation (the ability of the membrane to retain certain components while transmitting others).

Typically, polysulfonamide membranes are made of polymeric materials having a polymer backbone comprising a plurality of primary sulfonamide groups ($-SO_2-NH-$). Based on their chemical structure, polysulfonamide membranes might be expected to be stable in the presence of concentrated bases. However, it has been found that even relatively short exposure to elevated pH (e.g. about 10), can cause a polysulfonamide membrane to lose performance.

Primary sulfonamide polymers (polymer-$SO_2$—NH-polymer) have an acidic proton on a sulfonamide nitrogen. When exposed to sufficiently basic solutions this proton is removed and the sulfonamide group becomes negatively charged (as shown in the following scheme).

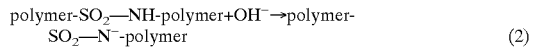

$$\text{polymer-SO}_2\text{—NH-polymer} + \text{OH}^- \rightarrow \text{polymer-SO}_2\text{—N}^-\text{-polymer} \quad (2)$$

This deprotonation renders many polymeric sulfonamides swellable. Such swelling often results in a polymer (e.g. a membrane polymer or film) that is mechanically weak and highly susceptible to damage.

Secondary sulfonamide polymers (polymer-$SO_2$—NR-polymer, wherein R is not H), which have been formed, for example, by the reaction of an activated sulfonyl compound and a secondary amine (see for example, R. C. Evers and G. F. L. Ehlers, *J. Polymer Science*, 1967, 5, 1797–1801), are incapable of being deprotonated at the sulfonamide nitrogen by base. As a result, such polymers may not swell when exposed to base.

This stability makes secondary sulfonamide polymers desirable materials, particularly for use in carrying out separations at high pH. Unfortunately, the number of secondary sulfonamide polymers available for carrying out separations is severely limited by the relatively slow reactivity of many secondary amines under the conditions typically used for preparing sulfonamide polymers.

Currently, the lack of base stability limits the use of primary sulfonamide polymers. Additionally, the unavailability of secondary sulfonamide polymers, as well as the difficulty encountered in preparing such polymers, limits their use. Thus, there is currently a need for secondary sulfonamide polymer matrices possessing advantageous properties (e.g. improved base stability, improved transport, improved adsorption, or improved selectivity of binding). There is also a need for improved methods for preparing secondary sulfonamide polymers.

SUMMARY OF THE INVENTION

It has been discovered that primary sulfonamide polymers can be modified by replacing sulfonamido protons with non hydrogen substituents. Accordingly, the invention can be used to provide base-stable polysulfonamide materials (e.g. polysulfonamide membranes), as well as sulfonamide matrices of modified structure. The invention also provides a method for modifying a primary sulfonamide material, the method comprising replacing one or more sulfonamido protons with nonhydrogen substituents.

The invention provides a general class of polymer material, and methods to produce them. These materials are sulfonamide matrices prepared by modification of a primary sulfonamide polymer via reaction of its sulfonamide nitrogen.

The methods of the invention can be used to modify matrices of interfacial films, as well as any other matrix incorporating primary sulfonamide bonds.

Thus, the invention provides sulfonamide membranes that exhibit exceptional RO and NF performances and excellent stability to basic conditions. The membranes are prepared by removing a reactive sulfonamide proton and replacing it with a less labile (base stable) species (R), as shown in the following scheme.

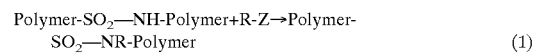

$$\text{Polymer-SO}_2\text{—NH-Polymer} + \text{R-Z} \rightarrow \text{Polymer-SO}_2\text{—NR-Polymer} \quad (1)$$

where R is the replacement group and Z is a suitable leaving group.

The invention also provides a sulfonamide polymer composite membrane wherein the sulfonamide polymer comprises sulfonyl compound residues having at least two sulfonyl moieties and amine compound residues having at least two amine moieties and at least some of the sulfonyl and amine moieties form sulfonamide groups and wherein the nitrogen amide groups have been converted to a non reactive group.

The invention also provides a sulfonamide polymer composite membrane wherein the sulfonamide polymer comprises sulfonyl compound residues having at least two sulfonyl moieties and amine compound residues having at least two amine moieties and at least some of the sulfonyl and amine moieties form sulfonamide groups and wherein at least some of the sulfonamide nitrogen groups have been converted to secondary sulfonamide groups.

These modifications, regardless of their ability to promote base stability, may provide membranes with improved properties due to their impact on surface energy and transport properties, which may beneficially alter passage and/or fouling resistance.

DETAILED DESCRIPTION OF THE INVENTION

Definitions

The term "primary sulfonamide polymer" means a solid-phase polymer matrix comprising one or more sulfonamide groups (—$SO_2$—NH—) in the polymer backbone. Preferably, the primary sulfonamide polymer is not derived (or derivable) from a branched or unbranched polyalkylamine (e.g. polyethyleneimine) having greater than 35 repeating monomeric alkylamine units. More preferably, the primary polysulfonamide polymer is not derived (or derivable) from a branched or unbranched polyalkylamine (e.g. polyethyleneimine) having greater than 25 repeating monomeric alkylamine units. More preferably, the primary sulfonamide polymer is not derived (or derivable) from a branched or unbranched polyalkylamine (e.g. polyethyleneimine) having greater than 10 repeating monomeric alkylamine units. Still more preferably, the primary polysulfonamide polymer is not derived (or derivable) from a branched or unbranched polyalkylamine (e.g. polyethyleneimine) having greater than 5 repeating monomeric alkylamine units. Still more preferably, the primary polysulfonamide polymer is not derived (or derivable) from a branched or unbranched polyalkylamine (e.g. polyethyleneimine) having greater than 3 repeating monomeric alkylamine units; and still more preferably, the primary sulfonamide polymer is not derived (or derivable) from a branched or unbranched polyalkylamine (e.g. polyethyleneimine) having greater than 2 repeating monomeric alkylamine units.

The term "secondary sulfonamide polymer" means a solid-phase polymer matrix comprising one or more secondary sulfonamide groups (—$SO_2$—NR—, wherein R is not hydrogen) in the polymer backbone.

The term "matrix" means a regular, irregular and/or random arrangement of polymer molecules. The molecules may or may not be cross-linked. On a scale such as would be obtained from SEM, X-Ray or FTNMR, the molecular arrangement may show a physical configuration in three dimensions like those of networks, meshes, arrays, frameworks, scaffoldings, three dimensional nets or three dimensional entanglements of molecules. Usually, the matrix is non-self supporting. The matrix may comprise an article of shape such as a bead or a film. Preferably, the matrix is in the form of a thin film with an average thickness from about 5 nm to about 600 nm, and more preferably about 5 to about 400 nm. In usual practice, the matrix is grossly configured as an ultra thin film or sheet.

The polymers of the invention can be used as coatings and in chromatography media, diagnostic media, medical devices, electronic components (e.g. storage media, photoresists, insulators), separation devices, membranes, battery electrolytes, fabric, and the like.

The term "membrane" means a semipermeable material which can be used to separate components of a feed fluid into a permeate that passes through the membrane and a retentate that is rejected or retained by the membrane.

The term "composite membrane" means a composite of a matrix layered or coated on at least one side of a porous support material.

The term "support material" means any substrate onto which the matrix can be applied. The substrate may be porous, or non-porous. Included are semipermeable membranes especially of the micro- and ultrafiltration kind, fabric, filtration materials as well as others.

The term "electophile" is understood in the art and includes compounds which have an atom or group of atoms capable of accepting electrons from an electron rich species and forming a new covalent bond. See for example J. March, Advanced Organic Chemistry, $4^{th}$ ed., 1992, John Wiley and Sons, New York.

The term "alkylating agent" is understood in the art and includes compounds capable of adding a substituted or unsubstituted carbon-linked group to another compound. See for example J. March, Advanced Organic Chemistry, $4^{th}$ ed., 1992, John Wiley and Sons, New York.

The term "A value" in the context of the present invention represents the water permeability of a membrane and is represented by the cubic centimeters of permeate water over the square centimeters of membrane area times the seconds at the pressure measured in atmospheres. An A value of 1 is essentially $10^{-5}$ $cm^3$ of permeate over the multiplicand of 1 centimeter squared of membrane area times 1 second of performance at a net driving pressure of one atmosphere. In the context of the present invention, A values given herein have the following unit designation: $10^{-5}$ $cm^3$/($cm^2$.sec.atm.) or $10^{-5}$ cm/(sec.atm) at 25° C.

$A$=permeate volume/(membrane area*time*net driving pressure).

The term "net driving pressure" is equal to the average trans-membrane pressure minus the feed-permeate osmotic pressure difference.

The term "transmission value" means the solute concentration in the permeate divided by the average of the solute concentration in the feed and in the concentrate, expressed as a percentage [i.e. transmission value=permeate/((feed+concentrate)/2), expressed as a percentage]. The concentrate is the fluid that flows completely past, but not through, the membrane. The term "retention value" means, in the context of the present invention, 100% minus the transmission value. The term "passage" or "% Pass" is equivalent to the transmission value. Unless otherwise stated, the retention and transmission values are achieved by passing a 1800 to 2200 ppm solution of the specified solute in DI water at a pH of 6.5 to 7.5, at 24–26 degrees C., at 221–229 psi transmembrane pressure, at a recovery value of less than 2%, at a Reynolds number of at least 2000 across the membrane, and by collecting permeate samples for permeation analysis between the first and second hour of testing. The term "recovery value" means, in the context of the present invention, the ratio of permeate fluid flow to feed fluid flow, expressed as a percentage.

The term "base labile", when referring to a substituent bound to a sulfonamido nitrogen, means that after exposure to a solution consisting of 1% sodium hydroxide in DI water for 5 minutes at 25° C., that less than 10% of the substituents have been removed.

The invention provides an alternate method for preparing secondary sulfonamide polymers, wherein a primary sulfonamide polymer is modified at the sulfonamide nitrogen to provide a secondary sulfonamide polymer.

Preferred primary sulfonamide polymers are prepared from primary amines (e.g. xylene diamine, ethylene diamine) and multifunctional sulfonyl halides.

The modification of the nucleophilic sulfonamide nitrogen can be carried out with nearly any electrophile. Suitable examples include compounds having groups such as, for example, epoxies, sulfates, diazo compounds, acid derivatives (including anhydrides, acid chlorides), halocarbons, carbocations, haloalkanes, halogens (NaOCl, $Br_2$), and the like.

For example, a sulfonamide of the invention can be prepared by treatment of a primary sulfonamide polymer with a basic solution of glycidol. Although not wishing to be bound by theory, it is believed that in this reaction the base (OH⁻) first deprotonates the sulfonamide nitrogen atom, followed by attack of the sulfonamide nitrogen to the epoxide ring of glycidol. As illustrated in Example 2, a primary sulfonamide polymer can be treated with a suitable base (e.g. sodium hydroxide) and an epoxide (e.g. glycidol) to provide a secondary sulfonamide polymer of the invention. Glycidol modified membranes also were found to have a lower water contact angle than the corresponding unmodified membrane. This may potentially decrease fouling of the membrane in many applications.

The sulfonamide nitrogen is fairly basic with protonation occurring at low pH. Thus, although only weakly nucleophilic, its reactivity can be maintained at extremely low pH values allowing the acid to be used for enhancing the electrophilicity or leaving group ability of reactants. This property was utilized in Example 3 to convert trioxane into a formaldehyde-derived carbocation. This species is able to react with the sulfonamide nitrogen lone pair generating an N-methoyl sulfonamide. Thus, a primary sulfonamide polymer can be alkylated under acidic conditions with a suitable aldehyde or ketone, or an equivalent thereof (e.g. trioxane) to provide a secondary sulfonamide polymer of the invention. Acid catalyzed addition may also be successful with epoxides such as glycidol. The epoxide oxygen can be protonated at low pH, increasing the leaving group ability of the bridged oxygen leading either to carbocation formation ($S_N1$), or direct reaction with the sulfonamide ($S_N2$).

Treatment of a sulfonamide membrane with a hypohalite (e.g. sodium hypochlorite) was found to stabilize the membrane, and also, to improve rejection in some cases. Thus, the modifications of primary sulfonamide polymers described herein (e.g. treatment with hypohalite) also can improve other properties (e.g. transport properties) of membranes, as well as pH stability. It is believed that the hypochlorite adds chlorine to the sulfonamide nitrogen. Chlorine addition did not appear to promote general high pH stability, though it is expected to be marginally more stable than unchlorinated samples. As illustrated in Example 10, a primary sulfonamide polymer can be treated with a suitable hypohalite (e.g. sodium hypochlorite) to provide a secondary sulfonamide polymer of the invention.

Although in some cases, all or most (e.g. about 80–90%) of the primary sulfonamide bonds in the primary sulfonamide polymer can be converted to secondary sulfonamide bonds; the invention includes polymers wherein only some (e.g. about 10%, 25%, 35%, or 50%) of the primary sulfonamide bonds in the primary sulfonamide polymer are converted to secondary sulfonamide bonds; as well as polymers wherein a smaller percentage (e.g. about 0.05%, 0.5%, 1%, or 5%) of the of the primary sulfonamide bonds in the primary sulfonamide polymer are converted to secondary sulfonamide bonds. In the latter case the conversion may selectively occur on a surface of the polymer.

If desired, control of time, reactants, and/or application method can be used to limit the location of the modification to specific regions of a polymer matrix. For example, large reagents may be used to modify sulfonamide bonds primarily at the surface of the matrix, as they will be unable to access internal bonds. This may be beneficial, for example, where an added functionality is meant to maximize or minimize the film's tendency to adsorb components in solution.

Typically, the secondary sulfonamide polymers of the invention are significantly more stable to base than the corresponding primary sulfonamide polymers. For example a preferred secondary sulfonamide polymers of the invention is 2-times more stable at pH 13 than the corresponding primary sulfonamide polymer. A more preferred secondary sulfonamide polymers of the invention is 5-times more stable at pH 13 than the corresponding primary sulfonamide polymer. An even more preferred secondary sulfonamide polymers of the invention is 10-times more stable at pH 13 than the corresponding primary sulfonamide polymer; and a most preferred secondary sulfonamide polymers of the invention is 25-times more stable at pH 13 than the corresponding primary sulfonamide polymer. When configured as membranes, preferred polymers of the invention exhibit less than a 500% increase in flow after exposure to an aqueous solution at pH 13 for 10 hours at room temperature. More preferred polymers of the invention exhibit less than a 100% increase in flow, and even more preferred polymers of the invention exhibit less than a 50% increase in flow, even more preferred polymers of the invention exhibit less than a 25% increase in flow, the most preferred polymers of the invention exhibit less than a 10% increase in flow.

In addition to altering pH stability, the modifications described herein (e.g. alkylation and halogenation) can alter the physio-chemical properties of the sulfonamide membrane. Examples of physio-chemical properties that can be altered include: charge, cross-link density, free volume, surface energy, and polarity. These changes can impact transport through the membrane, adsorption of solutes to the membrane, or selective binding through chelation. Thus, the modified polymers of the invention may demonstrate improved transport through the membrane, adsorption of solutes to the membrane, or selective binding through chelation, either alone, or in combination with improved pH stability.

In addition to improving the resistance to swelling at high pH, post modification may allow a wide variety of functionalities to be added after the desired matrix has been formed. As a result, previously mentioned properties are allowed, while deleterious effects such functionalities may have had on matrix formation are avoided. Such control may allow membranes with enhanced rejection (dissolved ions and/or dissolved organic compounds), minimized fouling, and improved stability to be realized.

EXAMPLES

Example 1

Membrane

An interfacial membrane was prepared in the following manner. An aqueous solution of triethylaminetetraamine (tech grade 60%, Aldrich Chemical Company, Milwaukee Wis., USA, 1.0% TETA by weight) and dimethylaminopyridine (0.1%) was poured onto the upper surface of a water wet PES support membrane (Osmonics, Inc, Minnetonka, Minn.: HW31). This solution was allowed to remain in contact with the support for 3 seconds, after which time the excess fluid was drained and metered with an air knife. An organic solution comprising 1,3,6-naphthalenetrisulfonyl chloride (0.16%) and xylene (10%) in Isopar G® was then poured on top of the metered aqueous solution. This organic solution and the aqueous solution were allowed to remain in contact with each other for 30 seconds before the excess organic solution was drained. The remaining organic solution was then allowed to evaporate at ambient temperature for 45 minutes. The membrane was then tested against a MgSO$_4$ feed to determine performance. After soaking in a sodium hydroxide solution (5% in DI water) for one hour at ambient temperature, the membrane was retested on the same feed solution.

Example 2

Glycidol Modification

A solution of glycidol (5% by weight in DI water), adjusted to pH 12 with sodium hydroxide, was prepared. A membrane was prepared as described in Example 1 and washed separately with methanol, then 2000 ppm CaCl$_2$ (aq), and finally DI water. The membrane was placed into the glycidol modification solution for three days at ambient temperature (21–23° C.). The resulting membrane was challenged on a MgSO$_4$ feed solution as described above.

The following table shows membrane performance results after exposure to a sodium hydroxide solution (5% in DI water) for one hour at ambient temperature, for both modified and unmodified membrane:

| Membrane | Membrane Performance | |
|---|---|---|
| | A val | % MgSO4 Pass |
| Example 1 (Unmodified) | 3.6 | 4.3 |
| After 5% NaOH for 1 hour | 49.0 | 76.3 |
| Example 2 (Modified) | 3.9 | 8.5 |
| After 5% NaOH for 1 hour | 3.4 | 8.0 |

Example 3

Membrane Analysis

An interfacial membrane was prepared in the following manner. An aqueous solution of tris(2-aminoethyl)amine (Aldrich Chemical Company, Milwaukee Wis., USA, 1.0% by weight) and dimethylaminopyridine (0.1%) was poured onto the upper surface of a water wet PES support membrane (Osmonics, Inc, Minnetonka, Minn.: HW31). This solution was allowed to remain in contact with the support for 15 seconds, after which time the excess fluid was drained and metered with an air knife. An organic solution comprising 1,3,6-naphthalenetrisulfonyl chloride (0.16%) and monoglyme (4.34%) in Isopar G® was then poured on top of the metered aqueous solution. This organic solution and the aqueous solution were allowed to remain in contact with each other for 60 seconds before the excess organic solution was drained. The remaining organic solution was then allowed to evaporate at ambient temperature for 15 minutes.

To modify the membrane, a solution of glycidol (5% by weight in DI water), adjusted to pH 12 with sodium hydroxide, was prepared. A membrane was prepared as described in Example 1 and washed with methanol. The membrane was placed into the glycidol modification solution for three days at ambient temperature (21–23° C.).

In order to investigate the mechanism of increased base stability, the effect of pH on surface chemistry was determined by the use of contact angle titrations. (Whitesides, G. W. et al. *Langmuir* 1985, 1, 725.) The following series of 0.05M buffer solutions were prepared. Each solution then was used as the test solution to determine membrane contact angle. At least three angles were recorded with each buffer.

| pH | Compound | grams in 500 ml of H$_2$O |
|---|---|---|
| 2.0 | Maleic acid | 2.902 g |
| 3.0 | Tartaric acid | 3.752 g |
| 4.0 | Succinic acid | 2.952 g |
| 5.0 | Acetic acid | 1.501 g |
| 6.0 | Maleic acid | 2.902 g |
| 7.0 | HEPES | 5.958 g |
| 8.0 | HEPES | 5.958 g |
| 9.0 | CAPS | 5.533 g |
| 10.0 | CAPS | 5.533 g |
| 11.0 | Triethylamine | 2.530 g |
| 12.0 | Sodium Phosphate dodecahydrate | 9.503 g |

(All reagents available from Aldrich) HCl or triethylamine was then added to either lower or raise the solution pH to the desired value.)

The unmodified membrane of this example was found to have an average contact angle of 43°±3°, for test solutions having a pH less than 9; for test solutions having a pH greater than 9, the average contact angle was found to be 34°±2°. The modified membrane of this example had an average contact angle of 31°±3°, which was independent of the pH of the test solution.

Example 4

Membrane

Membrane was prepared as described in Example 1 with the following changes. The amine solution used was ethylene diamine (1% by weight) and N,N-dimethylaminopyridine (0.1% by weight) in DI water and was dwelled for 1 minute. The organic phase was 1,3,6-naphthalenetrisulfonyl chloride (0.16% by weight) and xylene (10% by weight) in Isopar G and was left to react for 2 minutes. The organic solvent was allowed to evaporate over a 45 minute time period. The membrane was then run against a MgSO$_4$ feed to determine performance. After soaking in a sodium hydroxide solution (5% in DI water) for one hour at ambient temperature, the membrane was retested on the same feed solution.

Example 5

Glycidol Modification

A solution of glycidol (5% by weight in DI water), adjusted to pH 12 with sodium hydroxide, was prepared. A membrane was prepared as described in Example 4 and washed separately with methanol, 2000 ppm CaCl$_2$ (aq) and DI water. The membrane was placed into the glycidol modification solution for three days at ambient temperature (21–23° C.). The resulting membrane was challenged on a MgSO$_4$ feed solution as described above.

The following table shows membrane performance results for the membranes of Example 4 and Example 5, after exposure to a sodium hydroxide solution (5% in DI water) for one hour at ambient temperature.

| | Membrane Performance | |
|---|---|---|
| Membrane | A val | % MgSO4 Pass |
| Example 4 (Unmodified) | 6.1 | 3.2 |
| After 5% NaOH for 1 hour | 48.0 | 70.9 |
| Example 5 (Modified) | 2.5 | 21.1 |
| After 5% NaOH for 1 hour | 2.9 | 27.7 |

Example 6

Membrane

Membrane was prepared essentially as described in Example 1 but with the following changes: the amine solution used was 1,2-bis(2-aminoethoxy)ethane (also termed 1,8-diamino-3,6-dioxaoctane, 2% by weight), dimethylaminopyridine (0.1% by weight) in DI water which was dwelled for 1 minute. The organic phase was 1,3,6-naphthalenetrisulfonyl chloride (0.16% by weight) and xylene (10% by weight) in Isopar G and was left to react for 2 minutes. The organic solvent was allowed to evaporate over a 1 hour time period. The membrane was then tested against a $MgSO_4$ feed to determine performance. After soaking in a sodium hydroxide solution (5% in DI water) for one hour at ambient temperature, the membrane was retested on the same feed solution.

Example 7

Glycidol Modification

A solution of glycidol (5% by weight in DI water), adjusted to pH 12 with sodium hydroxide, was prepared. A membrane was prepared as described in Example 6 and washed separately with methanol, 2000 ppm $CaCl_2$ (aq) and DI water. The membrane was placed into the glycidol modification solution for three days at ambient temperature (21–23° C.). The resulting membrane was challenged on a $MgSO_4$ feed solution as described above.

The following table shows membrane performance results for the membranes of Example 6 and Example 7, after exposure to a sodium hydroxide solution (5% in DI water) for one hour at ambient temperature.

| | Membrane Performance | |
|---|---|---|
| Membrane | A val | % MgSO4 Pass |
| Example 6 (Unmodified) | 4.5 | 9.8 |
| After 5% NaOH for 1 hour | 79.6 | 82.9 |
| Example 7 (Modified) | 7.4 | 29.3 |
| After 5% NaOH for 1 hour | 6.8 | 33.9 |

Example 8

Membrane

An interfacial membrane was prepared in the following manner. An aqueous solution of ethylenediamine (1.0% by weight), triethylammonium camphorsulfonate (6.6%) and N,N-dimethylaminopyridine (0.1%) was poured onto the upper surface of a polysulfone support membrane. This solution was allowed to remain in contact with the support for 30 seconds, after which time the excess fluid was drained and metered with an air knife. An organic solution comprising 1,3,6-naphthalenetrisulfonyl chloride (0.16%) and monoglyme (4.5%) in Isopar G was poured on top of the metered aqueous solution. This organic solution and the aqueous solution were allowed to remain in contact with each other for 60 seconds before the excess organic solution was drained. The resulting membrane was placed in a lab oven at 100° C. for 5 minutes. The membrane was then tested against a $MgSO_4$ feed to determine performance. After soaking in a sodium hydroxide solution (10% in DI water) for one hour at ambient temperature, the membrane was re-tested on the same feed solution.

Example 9

Acid Catalyzed Modification

A solution comprising Trioxane (8.9%), glacial acetic acid (48.2%), formic acid (22.5%), and sulfuric acid (20.4%) was prepared. The membrane of Example 8 was immersed in this solution for 3 hours, then removed and rinsed thoroughly with RO water. The following table shows performance results for the membranes of Example 8 and Example 9, before and after exposure to a sodium hydroxide solution (10% in DI water) for one hour at ambient temperature.

| | Membrane Performance | |
|---|---|---|
| Membrane | A val | % MgSO4 Pass |
| Example 8 (Unmodified) | 17.6 | 39.1 |
| After 10% NaOH for 5 minutes | 167 | 92.9 |
| Example 9 (Modified) | 15.7 | 18.8 |
| After 10% NaOH for 5 minutes | 34.6 | 70.6 |

Example 10

Hypochlorite Modification

The membrane of Example 8 was tested on a feed of $MgSO_4$ in DI water. After determining the initial performance, a sufficient amount of 5.25% NaOCl was added to the feed solution to adjust the concentration to 50 ppm at ambient temperature. After 30 minutes of operation on this solution, performance was measured.

| | Membrane Performance | |
|---|---|---|
| Membrane | A val | % MgSO4 Pass |
| Example 8 (Unmodified) | 17.6 | 39.1 |
| Example 10 (Modified) | 8.4 | 11.9 |

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method for preparing a secondary sulfonamide polymer, the method comprising, alkylating one or more sulfonamido nitrogens of a corresponding primary sulfonamide polymer under acidic conditions; provided the primary sulfonamide polymer is not derived or derivable from a branched or unbranched polyalkylamine having greater than 35 repeating monomeric alkylamine units.

2. A method for preparing a solid secondary sulfonamide polymer, the method comprising, replacing one or more sulfonamido protons of a corresponding solid primary sulfonamide polymer that is part of a membrane with a substituent other than hydrogen; provided the primary sulfonamide polymer is not derived or derivable from a branched or unbranched polyalkylamine having greater than 35 repeating monomeric alkylamine units.

3. The method of claim 2 wherein the one or more sulfonamido protons are replaced by alkylating one or more sulfonamido nitrogens.

4. The method of claim 2 wherein the one or more sulfonamido protons are replaced by contacting the primary sulfonamide polymer with a suitable electrophile.

5. The method of claim 3 wherein the one or more sulfonamido nitrogens are alkylated by contacting the primary sulfonamide polymer with a suitable base and an alkylating agent.

6. The method of claim 2 wherein the one or more protons are replaced by contacting the primary sulfonamide polymer with a hypohalite.

7. The method of claim 6 wherein the hypohalite is sodium hypochlorite.

* * * * *